United States Patent Office 3,698,856
Patented Oct. 17, 1972

3,698,856
TREATMENT OF TEXTILE FIBERS
Allen G. Pittman, El Cerrito, and William L. Wasley, Berkeley, Calif., assignors to the United States of America as represented by the Secretary of Agriculture
No Drawing. Continuation-in-part of application Ser. No. 282,815, May 23, 1963. This application Nov. 22, 1966, Ser. No. 596,063
Int. Cl. C08f 15/18
U.S. Cl. 8—115.5                28 Claims

ABSTRACT OF THE DISCLOSURE

Acryloyl or methacryloyl chloride is co-polymerized with a fluoroalkyl ether or ester, for example, 1,1-dihydroperfluorooctyl acrylate. The copolymers are applied to textile materials, e.g., wool, to improve their properties, for example, their resistance to shrinking, and their water- and oil-repellency.

---

A nonexclusive, irrevocable, royalty-free license in the invention herein described, throughout the world for all purposes of the United States Government, with the power to grant sublicenses for such purposes, is hereby granted to the Government of the United States of America.

This application is a continuation-in-part of our prior application, Ser. No. 282,815, filed May 23, 1963, now abandoned.

This invention relates to and has among its objects the provision of novel processes for treating textile materials and the products of such processes. A broad object of the invention concerns modification of textile fibers by treating them with copolymers derived from acryloyl or methacryloyl chloride. A special object of the invention is the provision of such treatments involving the use of copolymers of (a) acryloyl or methacryloyl chloride and (b) fluoroalkyl acrylates or methacrylates, applied to and reacted with the textile material to provide such benefits as improved shrinkage resistance, enhanced repellency toward oil and water, etc. Further objects and advantages of the invention will be evident from the following description wherein parts and percentages are by weight unless otherwise specified.

In the processing of textiles it is often desirable to modify the inherent properties of the fibers, for example, to improve their shrinkage characteristics. Various procedures have been advocated for such purposes and they usually involve treatment of the textile with a resinous material. A common fault of many of these procedures is that the modification has but a temporary effect as the material is removed from the fibers when they are subjected to laundering or dry cleaning.

In accordance with the invention, textile materials are treated with certain copolymers which react with the textile materials so that the modification achieved is deep-seated and durable. In other words, the invention yields the advantage that the copolymer applied to the fibers is not just a physical coating but is chemically bonded or grafted to the fibers.

The copolymers used in accordance with the invention are generically defined as copolymers of (1) acryloyl or methacryloyl chloride with (2) a fluoroalkyl ester or ether which is copolymerizable with the said acryloyl or methacryloyl chloride, which contains at least a single $CH_2=C<$ grouping, and which is free from a hydrogen atom reactive with an acid chloride grouping. These copolymers contain pendant acid chloride

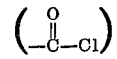

groups which react with those radicals of the textile material which have active hydrogen atoms. Such radicals may also be termed hydrogen-donor radicals and include such types of functions as hydroxyl, primary or secondary amine, primary amide, thiol, carboxyl, etc. Typically, with cellulosic textiles it is believed that the copolymers are chemically bound to the textile through ester linkages formed by reaction of hydroxyl groups on the textile with the pendant acid chloride groups of the copolymer. With protein fibers such as wool, the copolymers are believed to be chemically bound to the textile through any one or more of such linking radicals as; ester groups (by reaction of the pendant acid chloride groups of the copolymer with hydroxyl groups on the wool); amide groups (by reaction of the pendant acid chloride groups of the copolymer with primary or secondary amine groups on the wool); imide groups (by reaction of the pendant acid chloride groups of the copolymer with primary amide groups on the wool); thioester groups (by reaction of the pendant acid chloride groups of the copolymer with thiol groups of the wool); etc. The fact that a chemical bonding is achieved rather than a mere physical adhesion has been demonstrated by experiments wherein it was attempted to dissolve the grafted copolymer with solvents which are capable of dissolving the copolymers in bulk—see Example I (Part D) below. It was found that no substantial removal of copolymer was obtained, thus demonstrating a chemical bonding of the copolymer to the fibers.

PREPARATION OF THE COPOLYMERS

Examples of copolymers for use in practicing the invention and methods for preparing these copolymers are set forth below by way of illustration but not limitation.

In a particularly preferred modification of the invention, textiles—especially wool textiles—are treated with copolymers of (1) acryloyl or methacryloyl chloride and (2) fluoroalkyl esters of acrylic or methacrylic acid, that is, alkyl esters of acrylic or methacrylic acids wherein at least one hydrogen atom of the alkyl radical is replaced by fluorine. By using such fluorinated copolymers one achieves in a single procedure a plurality of useful effects, namely, increase in the resistance of the wool to shrinking and felting when its is laundered, an enhanced resistance to becoming soiled, enhanced water repellency and oil repellency, and even increased resistance to such wool-degrading agents as acids, alkalis, and aqueous oxidizing media. It is also to be noted that such a multi-purpose effect is attained with only a minor proportion of the fluorinated copolymer chemically bonded to the wool, that is, from about 0.5 to 5%, based on the weight of the textile, and there is no significant loss of the hand of the wool. Typical of the fluoroalkyl esters which may be copolymerized with acryloyl or methacryloyl chloride to produce copolymers for use in this modification of the invention are: perfluoro - t - butyl acrylate, perfluoro-t-butyl methacrylate, and esters of the type

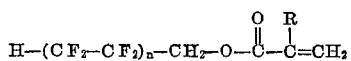

wherein R is H or CH₃ and n is an integer from 2 to 6. Typical examples of this type of primary perfluoroalkyl ester are:

1,1,5-trihydroperfluoropentyl acrylate and methacrylate,
1,1,7-trihydroperfluoroheptyl acrylate and methacrylate,
1,1,9-trihydroperfluorononyl acrylate and methacrylate,
1,1,11-trihydroperfluoroundecyl acrylate and methacrylate,
1,1,13-trihydroperfluorotridecyl acrylate and methacrylate, etc.

Usually, it is preferred that the fluoroalkyl radical contain at least 3 fluorine atoms and an especially desirable type of fluoroalkyl ester for the multi-purpose treatment mentioned above is one wherein the fluoroalkyl radical not only contains at least 3 fluorine atoms but also has its omega carbon atom completely fluorinated. Typical of these particularly preferred fluoroalkyl esters are those of the type

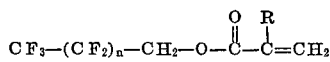

wherein R is H or CH₃ and n is an integer of from 0 to 18. Illustrative examples of such compounds are the acrylic and methacrylic acid esters of: 1,1-dihydroperfluoropropyl alcohol, 1,1-dihydroperfluorobutyl alcohol, 1,1-dihydroperfluorohexyl alcohol, 1,1-dihydroperfluorooctyl alcohol, 1,1-dihydroperfluorodecyl alcohol, 1,1-dihydroperfluorododecyl alcohol, 1,1-dihydroperfluorohexadecyl alcohol, 1,1-dihydroperfluorooctadecyl alcohol, etc.

Another useful class of fluoroalkyl esters which may be copolymerized with acryloyl or methacryloyl chloride includes the acrylic and methacrylic acid esters of the structure

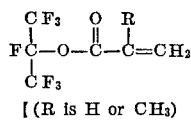

[(R is H or CH₃)

The compounds responding to the above formula may be prepared as described in our copending application, Ser. No. 398,129 filed Sept. 21, 1964, now Pat. 3,384,628. Typically, the adduct of hexafluoroacetone and an alkali metal fluoride

(M is an alkali metal)

is reacted with acryloyl (or methacryloyl) chloride to produce the ester

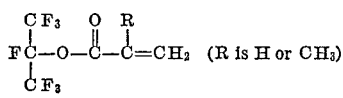

Further details on preparation of these esters are set forth below in Example IV.

Another useful class of fluoroalkyl esters which may be copolymerized with acryloyl or methacryloyl chloride includes the compounds of the structure

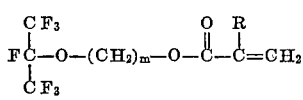

wherein

R is H or CH₃ and
m is an integer from 1 to 20.

The compounds responding to the above formula may be prepared as describe in our copending applications Ser. No. 477,331 filed Aug. 4, 1965, now Pat. 3,424,785, and Ser. No. 555,703, filed June 7, 1966, now Pat. 3,480,664. Typically, the aforesaid adduct of hexafluoroacetone and alkali metal fluoride is reacted with 2-bromoethyl acrylate

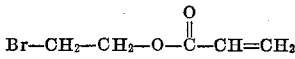

to produce the fluoroalkyl ester

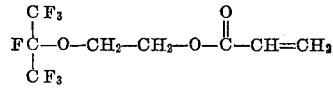

Further details on the synthesis are set forth in Examples V and VI below.

Still another useful category of fluoroalkyl esters which may be copolymerized with acryloyl or methacryloyl chloride includes the acrylic and methacrylic acid esters of the structures

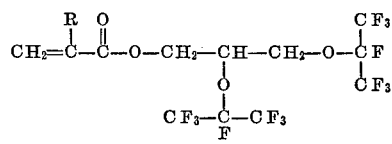

and

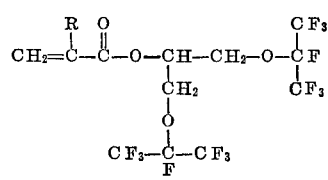

As disclosed in our copending application Ser. No. 555,703, filed June 7, 1966, now Pat. 3,480,664, these esters are prepared by reacting the adduct of hexafluoroacetone and an alikali metal fluoride with a dihalo(normal or iso)propyl acrylate or methacrylate. Details of a typical synthesis in this area are given in Example VII below.

Although it is generally preferred to copolymerize the acryloyl or methacryloyl chloride with an individual monomer such as those exemplified above, it is within the purview of the invention to use mixtures of two or more monomers. In a variation of this modification of the invention, one uses a polymer prepared by copolymerizing (1) acryloyl or methacryloyl chloride with (2) a mixture of a fluoroalkyl ester of acrylic or methacrylic and a non-fluorinated alkyl (at least C₈) acrylate or methacrylate. Typical polymers in this category are those derived from methacryloyl chloride, 1,1-dihydroperfluorooctyl acrylate, and an alkyl methacrylate such as lauryl, myristyl, palmityl, or stearyl methacrylate. Another plan involves use of a mixture of copolymers, i.e., applying to the wool a mixture of two different copolymers, one being, for example, a copolymer of acryloyl (or methacryloyl) chloride and a fluoroalkyl acrylate or fluoroalkyl methacrylate, the other being, for example, a copolymer of acryloyl (or methacryloyl) chloride and a non-fluorinated alkyl (at least C₈) acrylate or methacrylate. Specifically, such a mixture may comprise, as an illustrative example, (1) a copolymer of methacryloyl chloride and 1,1-dihydroperfluorooctyl acrylate and (2) a copolymer of methacryloyl chloride and lauryl or stearyl methacrylate.

In the category of fluoroalkyl ethers which may be copolymerized with acryloyl or methacryloyl chloride, one may employ: Allyl ethers such as

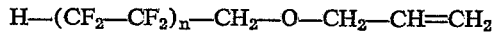

(wherein n is an integer from 2 to 6)

and

(wherein n is an integer from 0 to 18)

and

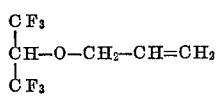

Vinyl ethers such as $$H-(CF_2-CF_2)_n-CH_2-O-CH=CH_2$$

(wherein $n$ is an integer from 2 to 6)

and $$CF_3-(CF_2)_n-CH_2-O-CH=CH_2$$

(wherein $n$ is an integer from 0 to 18)

and

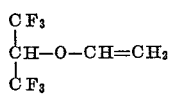

More preferably, we use the ally (or vinyl) ethers of heptafluoroisopropyl alcohol, i.e.:

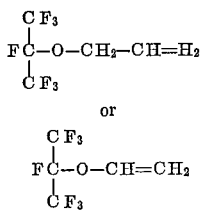

These compounds form the subjects of our copending applications Ser. No. 433,818, filed Feb. 18, 1965, now Patent 3,382,222, and Ser. No. 457,533, filed May 20, 1965, now Patent 3,465,045, respectively. Typically, the allyl ether is prepared by reacting the adduct of hexafluoroacetone and KF with an equimolar quantity of allyl bromide at about 80–90° C. preferably in an inert solvent such as the dimethyl ether of diethylene glycol.

The copolymers used in practicing the invention are prepared by conventional polymerization techniques. These essentially involve intimate contact under anhydrous conditions of the acryloyl (or methacryloyl) chloride with the other monomer to be copolymerized therewith. The reactants may be copolymerized under the influence of heat, light, or heat plus light in the presence or absence of a polymerization catalyst such as, for example, benzoyl peroxide, acetyl peroxide, lauroyl peroxide, di-tert-butyl peroxide, or other organic peroxide or other catalyst which is free from a hydrogen atom or atoms that would react with the acid chloride grouping. The copolymerization is continued until there is formed a viscous liquid to solid material which is soluble in common solvents for resins, typically toluene, xylene, benzotrifluoride, ethyl acetate, 1,3-bis-(trifluoromethyl)benzene, etc. Ultraviolet light is more effective than ordinary light in catalyzing the polymerization. The polymerization may be conducted in the bulk or in the solution state, for instance, in solution in an inert solvent such as benzene, toluene, xylene, dioxane, dibutyl ether, butyl acetate, chlorobenzene, ethylene dichloride, methyl ethyl ketone, or fluorohydrocarbons such as benzotrifluoride, 1,3-bis-(trifluoromethyl)benzene, etc. The temperature of polymerization may be varied as desired or the conditions may require and generally will be within the range from about 20° to 150° C. when polymerization is effected in the absence of a solvent. When polymerization is carried out in solution, it is generally carried out at the boiling temperature of the solution. It is obvious that in any particular case, the temperature of polymerization should be below the decomposition temperature of the monomers being reacted and that of the copolymer being prepared. In a preferred modification of the process, the monomers are reacted in bulk, i.e., with no solvent, and copolymerization is effected at a temperature of about 70–100° C. with the use of an $\alpha,\alpha'$-azodialkylcyanide type catalyst, such as $\alpha,\alpha'$-azodiisobutyronitrile or $\alpha,\alpha'$-azobis-($\alpha,\gamma'$-dimethylvaleronitrile).

In preparing the copolymers of the invention, the proportions of acryloyl chloride (or methacryloyl chloride) and the other monomer may be varied widely. In general, one copolymerizes about 10 to 90% of acryloyl or methacryloyl chloride and 90 to 10% of the other monomer. In many instances, for example, in preparing the preferred fluorinated copolymers, one uses one mole of acryloyl or methacryloyl chloride in conjunction with about 1 to 10 moles of the other monomer, e.g., the fluoroalkyl acrylate or methacrylate.

APPLICATION OF THE COPOLYMER TO THE TEXTILE

The copolymers of the invention may be applied to the textile in various ways. One technique involves applying the copolymer as such to the textile, using heating to make the copolymer flow and distributing it with calender rolls or the like. Generally, this technique is not a preferred one because it causes a stiffening of the textile and is thus suitable only in instances where such stiffening effect is desirable or tolerable. A preferred technique involves dissolving the copolymer in an inert, volatile solvent and applying the resulting solution to the textile material. Typical of the solvents which may be used are benzene, toluene, xylene, dioxane, diisopropyl ether, dibutyl ether, butyl acetate, chlorinated hydrocarbons such as chloroform, carbon tetrachloride, ethylene dichloride, trichloroethylene, 1,3-dichlorobenzene, fluorohydrocarbons such as benzotrifluoride, 1,3-bis-(trifluoromethyl)benzene, etc., petroleum distillates such as petroleum naphthas, etc. The concentration of the copolymer in the solution is not critical and may be varied depending on such circumstances as the solubility of the copolymer in the selected solvent, the amount of copolymer to be deposited on the fibers, the viscosity of the solution, etc. In general, a practical range of concentration would be from about 1% to about 25%. The solution may be distributed in the textile material by any of the usual methods, for example, by spraying, brushing, padding, dipping etc. A preferred technique involves immersing the textile in the solution and then passing it through squeeze rolls to remove the excess of liquid. Such techniques as blowing air through the treated textile may be employed to reduce the amount of liquid which exists in interstices between fibrous elements. In any case, the conditions of application are so adjusted that the textile material contains the proportion of copolymer desired. Usually, the amount of copolymer is about from 0.5 to 20%, based on the weight of the textile material but it is obvious that higher proportions of copolymer may be used for special purposes. Usually, in treating textiles such as fabrics the amount of copolymer is limited to a range of about 0.5 to 10% to attain the desired end such as shrink resistance without interference with the hand of the textile.

In another technique ap re-formed copolymer is not used but the textile material is impregnated with a solution containing the acryloyl chloride (or methacryloyl chloride) plus the other monomer copolymerizable therewith. The solvent for forming the solution is an inert, volatile, organic solvent as typified by those listed above. In this technique the copolymerizable monomers react during the curing step (described below), forming the copolymer in situ and chemically bonding the so-formed copolymer to the textile fibers. To assist the in situ polymerization, the solution of the unreacted polymers may contain a minor proportion of a suitable polymerization catalyst or the catalyst may be applied in a separate step before or after the monomers are deposited on the fibrous material. A typical embodiment of this system may take the following form: A solution, in ethyl acetate, is prepared containing equimolar proportions of methacryloyl chloride and 2-(heptafluoroisopropoxy)-ethyl acrylate. The textile material is immersed in this solution, then passed through squeeze rolls to press out excess solution and leave about 1 to 5% of the monomers, based on the weight of the textile. The treated textile is then passed through a dilute solution of benzoyl peroxide in an inert, volatile solvent or exposed to ultra-violet light. The treated textile is then cured as described below. It is obvious that many variations may be applied in this system; for example, the copolymerizable monomers may be applied in separate solutions in inert, volatile solvents and the catalyst may be incorporated in one of these solutions or applied in a separate step.

After application of the copolymer (or the reactive monomers) the treated textile is cured (heated) to effect reaction between the textile material and the copolymer, or to effect formation of the copolymer from the reactive monomers, and to bond the so-formed polymer to the fibers. In cases where the polymer is applied as a disperson, that is, a solution, emulsion, or suspension, the solvent or other volatile dispersing medium is preferably evaporated prior to the curing operation. Such prior evaporation is not a critical step and the evaporation may be simply effected as part of the curing step. The temperature applied in the curing step is not critical and usually is within the range from about 50° C. to about 150° C. It is obvious that the time required for the curing will vary with such factors as the reactivity of the selected copolymer, the type of textile material, and particularly the temperature so that a lower curing temperature will require a longer curing time and vice versa. It will be further obvious to those skilled in the art that in any particular case the temperature of curing should not be so high as to cause degradation of the textile or the copolymer. In many cases an adequate cure is effected by heating the treated textile in an oven at about 100° C. for about 5 to 60 minutes.

Instead of employing the above described technique of application of the copolymer followed by curing, the application and curing can be done in a single step. In this technique the copolymer is formed into a solution in an inert, volatile, organic solvent such as those listed above, the textile material is entered into the solution, and the system heated, for example, to 100° C. or up to reflux temperature (boiling point) of the selected solvent. In this way the copolymer reacts directly with the textile material. Usually to promote the reaction, there is added to the solution a minor proportion (i.e., 1 to 10% of the weight of the copolymer) of pyridine, dimethyl-aniline, or other tertiary amine free from reactive hydrogen atoms to act as an HCl-acceptor. Reaction-promoting agents such as dimethylformamide or diethylformamide may be used in conjunction or in place of the tertiary amine.

Although the present invention is of particular advantage in its application to wool, this is by no means the only type of fiber which comes into the ambit of the invention. Generically, the invention is applicable to the treatment of any hydrogen-donor textile material and this material may be in any physical form, e.g., bulk fibers, filaments, yarns, threads, slivers, roving, top, webbing, cord, tapes, woven or knitted fabrics, felts or other nonwoven fabrics, garments or garment parts. Illustrative examples of hydrogen-donor textile materials are: polysaccharide-containing textiles, for instance, those formed of or containing cellulose or regenerated celluloses, e.g., cotton, linen, hemp, jute, ramie, sisal, cellulose acetate rayons, cellulose acetate-butyrate rayons, saponified acetate rayons, viscose rayons, cuprammonium rayons, ethyl cellulose, fibers prepared from amylose, algins, or pectins; mixtures of two or more of such polysaccharide-containing textiles; protein-containing textiles, for instance, those formed of or containing wool, silk, animal hair, mohair, leather, fur, regenerated protein fibers such as those prepared from casein, soybeans, peanut protein, zein, gluten, egg albumin, collagen, or keratins, such as feathers, animal hoof or horn; mixtures of any two or more of said protein-containing textiles; mixtures of polysaccharide-containing textiles and protein-containing textiles, e.g., blends of wool and cotton, wool and viscose, etc.; textiles formed of or containing synthetic resins having hydroxy groups in the molecule, e.g., alkyd resins containing hydroxyl groups, polyvinyl alcohol, and partially esterified or partially etherified polyvinyl alcohols; synthetic silk, e.g., nylon, polyurethanes, etc.; mixtures of nylon or other synthetic silk with a polysaccharide or protein fiber; mixtures of synthetic resins containing hydroxyl groups with nylon, polyurethanes, polysaccharides, or protein fibers. By applying the invention to hydrogen-donor textiles, such as those exemplified above, desirable results are attained. These include: increasing the resistance of the textile to shrinking or felting when subjected to washing operations; increasing the resistance of the textile to becoming soiled in use; enhancing the oil- and water-repellency of the textile; decreasing the tendency of the textile to becoming creased or wrinkled during wear or during wear or during washing and drying operations; etc. Moreover, these desirable effects are attained without impairing such desirable fiber characteristics or tensile strength, abrasion resistance, porosity, and the hand of the material so that the textiles modified in accordance with the invention may be used in fabricating garments or other conventional structures of any kind. The invention may also be applied to textiles which contain absorbed or combined water or which have a thin film of water adsorbed on the surface, e.g., glass fibers, asbestos, etc. In such cases the water reacts with the acryloyl (or methacryloyl) chloride copolymer and insolubilizes the latter in situ.

*Examples*

The invention is further demonstrated by the following illustrative examples.

The various tests referred to in the examples were carried out as follows:

Oil repellency.—The 3 M oil repellency test described by Grajeck and Petersen, Textile Research Journal, 32, pp. 320–331, 1962. Ratings are from 0 to 150, with the higher values signifying the greater resistance to oil penetration.

Water repellency.—AATC spray test, method 22–1952. Ratings are from 0 to 100 with the higher values signifying greater resistance to water penetration.

Home laundering procedure.—An agitator-type home washing machine was operated under the following conditions: Low water level (about 11 gal.); wash temperature, 115–120° F.; rinse temperautre, 95–115° F.; normal agitation; 12-minute wash cycle; load—2 pounds ballast plus samples, total weight not exceeding 4 pounds; 100 cc. "Tide" detergent. Washed samples were dried 15 minutes in a forced draft oven at 160° F.

Accelerotor shrinkage test.—The fabric samples (5″ x 6″) were milled at 1780 r.p.m. for 2 minutes at 40° C. in an Accelerotor with 1% sodium oleate solution, using a liquor-to-fabric ratio of about 50 to 1. After this washing operation, the samples were measured to determine their area and the shrinkage calculated from the original area. The Accelerotor is described in the American Dyestuff Reporter 45, p. 685, Sept. 10, 1956. The 2-minute wash in this device is equal to approximately 15 home launderings.

Abbreviations: In the following examples the compound 1,1-dihydroperfluorooctyl acrylate is referred to as PFOA; methacryloyl chloride as MAC; and copolymers of these compounds are referred to as poly-PFOA/MAC. A numerical ratio following the designation of the copolymer refers to a molar ratio of the monomers, for example, "poly-PFOA/MAC 3/1" means the copolymer prepared from 3 moles PFOA and 1 mole of MAC.

EXAMPLE I

(A) Preparation of PFOA/MAC copolymers

Poly-PFOA/MAC 3/1: Into a dry, 4-oz. vial were placed 11.8 g. (0.026 mole) of 1,1-dihydroperfluorooctyl acrylate,

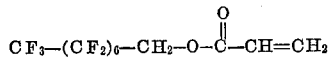

0.92 g. (0.0088 mole) of methacrylol chloride, and 50 mg. of $\alpha,\alpha'$-azodiisobutyronitrile. The vial was closed with a screw cap and placed in a 78° C. bath for 3–4 hours. The copolymer was a tacky solid with an inherent viscosity of 0.21 at 25° C. in 1,3-bis-(trifluoromethyl) benzene.

Poly-PFOA/MAC 1/1 and Poly-PFOA/MAC 9/1 were prepared in the same manner as above but substituting the appropriate molar proportions of PFOA and MAC, namely, equimolar proportions of PFOA and MAC for the 1/1 copolymer and 9 moles of PFOA to 1 mole of MAC for the 9/1 copolymer. Both the 1/1 and 9/1 copolymers were tacky solid resins.

(B) Application of PFOA/MAC copolymers

Each of the PFOA/MAC copolymers described in Part A was dissolved in a minimum quantity of benzotrifluoride, then the solution was diluted with the same solvent to the desired concentration. In this way, solutions at concentration levels of 1.5%, 3%, and 7% were prepared from each of the copolymers. (The different concentration levels were used to enable application of varying amounts of the copolymers onto a fabric.) The solutions were applied to samples of wool fabric (7.06 oz./sq. yd. undyed woolen flannel, 33 ends and 33 picks per inch) in the following manner:

The fabric was immersed in the copolymer solution, then passed through squeeze rolls to provide a wet pickup of about 70%. The treated fabric was then placed in an oven at 105° C. for about 1.5 hours in order to cure the resin and bond it to the wool. After curing, the samples were weighed to determine the amount of copolymer on the fabric.

(C) Oil and water repellency and shrinkage tests of PFOA/MAC-treated fabric

The treated fabric samples were tested to determine their oil and water repellency, then subjected to a series of 15 washings by the home laundering method described above. After each third laundering operation, the tests for oil and water repellency were repeated. (To prevent interference of residual detergent with the water and oil repellency tests, the fabrics were rinsed with carbon tetrachloride eacht time prior to applying the said tests.) Also, after the 6th, 9th, 12th, and 15th laundering operations, the samples were measured in order to ascertain the area shrinkage.

The results obtained are tabulated below:

(D) Further tests on PFOA/MAC-treated fabric

Samples of the wool fabric treated with PFOA/MAC copolymers by the procedure of Example I, Part B, and a sample of the untreated fabric (control) were subjected to a series of mechanical tests to compare their properties. The results are tabulated below:

| | Fabric treated with— | | |
|---|---|---|---|
| Test | 2.8% poly- PFOA/ MAC 1/1 | 2.9% poly- PFOA/ MAC 3/1 | Untreated fabric (control) |
| Flexural rigidity (warp),[1] mg.-cm. | 159 | 186 | 100 |
| Wrinkle recovery (warp),[2] degrees | 148 | 147 | 148 |
| Fabric break strength (warp),[3] lbs. | 18.3 | 17.2 | 15.2 |
| Fabric tear (Elmendorf),[4] grams | 16 | 16 | 17 |
| Abrasion resistance,[5] cycles | 505 | 551 | 508 |

[1] Cantilever procedure ASTM D1388-55T.
[2] ASTM D1295-53T, using the Monsanto wrinkle recovery tester.
[3] ASTM D39-40, cut strip method, 6" x 1" samples, 3" gauge, 20 sec. to break.
[4] ASTM D1424-56T, using the Elmendorf falling pendulum tester.
[5] Stoll abrader, ASTM D1175-55T.

Samples of the wool fabric treated with PFOA/MAC copolymers by the procedure of Example I, Part B, and a sample of the untreated fabric (control) were subjected to tests for acid, alkali, and peracetic solubility. These tests were performed as follows:

Acid solubility.—Samples were exposed 1 hour to 4 M HCl at 65° C. Loss in weight is measure of acid solubility.

Alkali solubility.—Samples were immersed 1 hour in 0.1 M NaOH at 65° C. Loss in weight is a measure of alkali solubility.

Peracetic acid solubility.—Samples were exposed 25 hours to 2% peracetic acid, then treated with 0.3% ammonia. Loss in weight is a measure of solubility in this medium.

The results obtained are tabulated below:

Acid, Alkali, and Peracetic solubility of PFOA/MAC-Tested Fabrics

| Copolymer | Amount of copolymer on fabric, percent | Solubility in percent of— | | |
|---|---|---|---|---|
| | | Acid | Alkali | Peracetic acid |
| Poly-PFOA/MAC (1/1) | 6.1 | 7.8 | 4.5 | 82.7 |
| Do | 4.0 | 6.8 | 6.2 | |
| Do | 2.6 | 8.4 | 7.6 | 83.6 |
| Poly-PFOA/MAC (3/1) | 6.4 | 6.9 | 5.5 | 81.1 |
| Do | 4.0 | 8.5 | 7.7 | |
| Do | 2.0 | 8.1 | 7.5 | 82.3 |
| None (control) | 0 | 13.0 | 9.8 | 81.9 |

In order to test the resistance of the applied copolymers to solvents, samples of the wool fabrics treated with poly-PFOA/MAC were subjected to continuous extraction with benzotrifluoride in a Soxhlet extractor. At intervals, weighings were made to determine the amount of polymer remaining on the fabric.

| Run | Copolymer | Amount of copolymer on fabric, percent | Test | Number of home launderings | | | | | |
|---|---|---|---|---|---|---|---|---|---|
| | | | | 0 | 3 | 6 | 9 | 12 | 15 |
| 1 | Poly-PFOA/MAC, 3/1 | 5.1 | Oil repellency | 130 | 70 | 70 | 0 | 0 | 0 |
| | | | Water repellency | 90 | 90 | 100 | 70 | 80 | 80 |
| | | | Area shrinkage, percent | | | 0 | 0 | 0 | 3 |
| 2 | do | 2.2 | Oil repellency | 130 | 60 | 60 | 50 | 0 | 0 |
| | | | Water repellency | 90 | 90 | 100 | 70 | 80 | 80 |
| | | | Area shrinkage, percent | | | 1 | 2 | 5 | 10 |
| 3 | do | 1.1 | Oil repellency | 130 | 50 | 60 | 0 | 0 | 0 |
| | | | Water repellency | 90 | 90 | 100 | 80 | 80 | 80 |
| | | | Area shrinkage, percent | | | 2 | 4 | 11 | 16 |
| 4 | Poly-PFOA/MAC, 1/1 | 6.2 | Oil repellency | 130 | 60 | 90 | 50 | 50 | 0 |
| | | | Water repellency | 90 | 0 | 100 | 80 | 80 | 80 |
| | | | Area shrinkage, percent | | | 1 | 2 | 4 | 9 |
| 5 | do | 2.3 | Oil repellency | 130 | 50 | 70 | 50 | 0 | 0 |
| | | | Water repellency | 100 | 90 | 100 | 70 | 70 | 70 |
| | | | Area shrinkage, percent | | | 1 | 3 | 5 | 20 |
| 6 | do | 1.1 | Oil repellency | 130 | 50 | 70 | 50 | 0 | 0 |
| | | | Water repellency | 90 | 90 | 100 | 100 | 70 | 80 |
| | | | Area shrinkage, percent | | | 1 | 5 | 9 | 20 |
| 7 | Poly-PFOA/MAC, 9/1 | 6.4 | Oil repellency | 130 | 70 | 100 | 90 | 60 | 60 |
| 8 | Control (untreated fabric) | 0 | Oil repellency | 0 | | | | | |
| | | | Water repellency | 60–70 | | | | | |
| | | | Area shrinkage, percent | | | 15 | 20 | | |

The results are summarized below:

| Copolymer | Name of extraction | | | | |
|---|---|---|---|---|---|
| | 0 | 6 | 13 | 20 | 27 |
| | Amount of copolymer on fabric, percent | | | | |
| Poly-PFOA/MAC (1/1) | 3.8 | 2.2 | 2.2 | 2.2 | 2.2 |
| Poly-PFOA/MAC (3/1) | 3.5 | 2.7 | 2.7 | 2.7 | 2.7 |

EXAMPLE II

A mixture of 1,1,11-trihydro-perfluoroundecyl acrylate (6 g., 0.01 mole), methacryloyl chloride (0.33 g., 0.0033 mole), and 50 mg. of $\alpha,\alpha'$-azodiisobutyronitrile was heated in a closed vessel at 78° C. 3½ hours. The product was a waxy solid copolymer.

Samples of the copolymer were dissolved in benzotrifluoride to prepare solutions containing 1.5%, 3%, and 6% of the copolymer. These solutions were applied to wool and the treated wool cured, in the manner as described in Example I. The products were then tested for shrinkage and water repellency.

The results are tabulated below:

| Run | Amount of copolymer on wool, percent | Area shrinkage (Accelerotor method), percent | Water repellency |
|---|---|---|---|
| 1 | 1.5 | 15.4 | 70 |
| 2 | 3 | 10.7 | 80 |
| 3 | 6 | 4.9 | 80 |

EXAMPLE III

| | | |
|---|---|---|
| Lauryl methacrylate (0.025 mole) | g | 6 |
| PFOA (0.0044 mole) | g | 2 |
| MAC (0.0045 mole) | g | 0.45 |
| $\alpha,\alpha'$-Azodiisobutyronitrile | g | 0.1 |

The ingredients listed above were mixed and heated in a closed vessel at 80° C. for 3 hours. The resulting polymer was dissolved in ethyl acetate, to prepare solutions containing 0.5, 1.5, 3, and 6% of the polymer. These solutions were applied to wool and the treated wool cured, all as described in Example I.
were applied to wool and the treated wool cured, all as described in Example I.

The results of various tests on the products are tabulated below:

| Run | Amount of polymer on wool, percent | Area shrinkage (Accelerotor method), percent | Oil repellency | Water repellency |
|---|---|---|---|---|
| 1 | 0.5 | 6.0 | 60 | 70 |
| 2 | 1.5 | 2.0 | 60 | 70 |
| 3 | 3.0 | 1.0 | 70 | 70 |
| 4 | 6.0 | 1.0 | 80 | 80 |

The expression "diglyme," used in the following examples, is an abbreviation for dimethyl ether of diethylene glycol.

EXAMPLE IV

Preparation of heptafluoroisopropyl acrylate

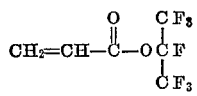

An apparatus was assembled including a 3-neck flask equipped with thermometer, stirrer, and a reflux condenser cooled with Dry Ice (solid $CO_2$). The open end of the condenser was connected to a drying tube to prevent ingress of moisture from the air. The system was flushed with nitrogen, then 76 g. (0.5 mole) dry cesium fluoride and 200 ml. dry diglyme were placed in the flask and mixed. The dispersion was cooled to minus 40° C., by applying a Dry Ice cooling bath to the flask, and 84 grams (0.056 mole) of hexafluoroacetone was introduced into the flask. The cooling bath was then removed and the system allowed to come to room temperature. As the system warmed, formation of the fluorocarbinolate intermediate was evidenced by disappearance of the dispersed CsF, giving a homogeneous solution.

Acryloyl chloride (41 g., 0.45 mole) was then added with stirring. A precipitate formed immediately. Stirring was continued at room temperature for ½ hour.

The mixture was poured into 3 volumes of water. The lower phase was collected, washed three times with 100-ml. portions of water. Eight-six grams of crude product was obtained. The product was dried over calcium sulphate, and distilled in vacuo through a short Vigreux column. Seventy-eight grams of purified product—heptafluoroisopropyl acrylate—was collected as a clear liquid, B.P. 75.5° C. at 760 mm. of Hg.

EXAMPLE V

Preparation of 2-(heptafluoroisopropoxy)ethyl acrylate

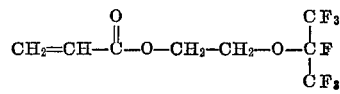

A 3-necked, 250-ml., round-bottomed flask was dried and charged with 17.4 g. (0.3 mole) of anhydrous KF and 150 ml. anhydrous diglyme. Fifty grams (0.3 mole) of hexafluoroacetone was introduced slowly and the mixture stirred. After formation of the hexafluoroacetone-KF adduct was completed, as evidenced by the disappearance of dispersed KF, 38.5 grams (0.21 mole) of 2-bromoethyl acrylate

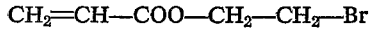

was added in one shot. The mixture was stirred and heated at 75° C. for 20 hours. At the end of this time, the reaction mixture was poured into 300 ml. of ice water. The lower fluorocarbon layer was recovered, washed with water, dried over $CaSO_4$, and distilled, giving 23 grams of pure product, B.P. 78° C. at 47 mm. Hg, $N_D^{25}$ 1.3424.

EXAMPLE VI

Preparation of 2-heptafluoroiso-isopropoxy)ethyl methacrylate

The synthesis was carried out as in Example V, using 0.3 mole of KF, 0.3 mole of hexafluoroacetone, and 0.4 mole of 2-chloroethyl methacrylate. The product was obtained in 60% yield, B.P. 100° C. at 45 mm. Hg.

EXAMPLE VII (A) Preparation of 2,3-dibromo-n-propyl acrylate

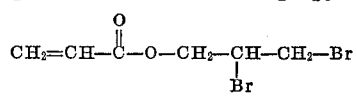

Thirty-six grams (0.4 mole) of acryloyl chloride were reacted with 65.4 grams (0.3 mole) of 2,3-dibromopropanol at 60° C. for 4 hours, using a nitrogen purge to remove gaseous HCl. Distillation yielded 55 grams of 2,3-dibromo-n-propyl acrylate, B.P. 103° C. at 4.55 mm. Hg, $N_D^{24}$ 1.5195.

(B) Preparation of 2,3-bis(heptafluoroisopropoxy)-n-propyl acrylate

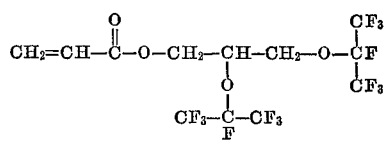

Into a 1-liter, 3-necked flask were placed 44 grams (0.76 mole) of anhydrous KF and 400 ml. of dry diglyme. The mixture was stirred and 125 grams (0.76 mole) of hexafluoroacetone gas ($CF_3$—CO—$CF_3$) was added at such a rate that the condensed gas dripped slowly from an attached Dry Ice condenser. After the addition of hexafluoroacetone was completed, the reaction mixture was stirred for an additional period (about ½ hr.) until formation of the adduct

was complete, as evidenced by the disappearance of dispersed KF.

Then, 53 grams (0.19 mole) of 2,3-dibromo-n-propyl acrylate were added in one shot and the mixture heated at 75° C. for 46 hours. At the end of this time, the resulting slurry was poured into 500 ml. of cold water. The lower fluorocarbon layer was collected and washed three times with additional water. The washed liquid (60 grams) was dried over $CaSO_4$ and distilled. The distilled product (B.P. 85–90° C. at 4–6 mm. Hg) contained ca. 30% of the desired ester, 2,3-bis-(heptafluoroisopropoxy)-n-propyl acrylate; 20% of mono-addition product (2-bromo - 3 - heptafluoroisopropoxy - n - propyl acrylate, or 3 - bromo-2-heptafluoroisoproproxy-n-propyl acrylate, or a mixture of the two); and 50% of unreacted dibromo-acrylate. A quantity of pure 2,3-bis(heptafluoroisopropoxy)-n-propyl acrylate was obtained by preparative gas chromatography, $N_D^{24}$ 1.3335.

*Analysis.*—Calculated for $C_{12}F_{14}H_8O_4$: C, 29.8; H, 1.7. Found: C, 29.7; H, 1.5.

Having thus described the invention, what is claimed is:

1. A copolymer of a fluoroalkyl ester of acrylic or methacrylic acid and acryloyl or methacryloyl chloride which is suitable for use as an oil- and water-repellent coating on a fibrous or porous surface, the copolymer having a carbon-to-carbon main chain and containing recurring monovalent perfluorocarbon groups containing from 4 to 18 carbon atoms and recurring acyl chloride radicals, the copolymer being the copolymerization product of about 1 to 10 moles of the first-named monomer per mole of the second-named monomer, said polymer having the ability to chemically bond to hydrogen donor substrates.

2. A polymer according to claim 1 which contains recurring monovalent unit groups derived from an acrylate-type ester of an omega-perfluoroalkyl alkanol.

3. A polymer according to claim 2 wherein the ester has the formula:

4. A solution of a polymer according to claim 1 in an organic solvent, said solvent being free of groups capable of reacting with acyl halide radicals.

5. A solution of a polymer according to claim 2 in an organic solvent, said solvent being free of groups capable of reacting with acryl halide radicals.

6. A textile fabric which has been sized with a solution of an organic solvent containing a polymer according to claim 1 so as to have been rendered oil repellent, said solvent being free of groups capable of reacting with acyl halide radicals.

7. A textile fabric which has been sized with a solution of an organic solvent containing a polymer according to claim 2 so as to have been rendered oil repellent, said solvent being free of groups capable of reacting with acyl halide radicals.

8. Fibers coated with a polymer according to claim 1 so as to have been rendered oil repellent.

9. Fibers coated with a polymer according to claim 2 so as to have been rendered oil repellent.

10. A copolymer of (1) an acid chloride selected from the group consisting of acryloyl chloride and methacryloyl chloride, and (2) a fluoroalkyl ester or ether which is polymerizable with said acid chloride, which contains a $CH_2=C<$ groupings, which is free from a hydrogen atom reactive with an acid chloride grouping, and wherein the fluoroalkyl group contains 2 to 20 carbon atoms.

11. The copolymer of claim 10 wherein the compound (2) is an ester of the group consisting of fluoroalkyl acrylates and fluoroalkyl methacrylates.

12. The copolymer of claim 10 wherein the compound (2) is an ester of the formula

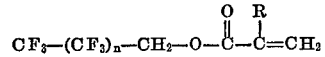

wherein R is a member of the group consisting of H and $CH_3$ and $n$ is an integer from 0 to 18.

13. The copolymer of claim 10 wherein the compound (2) is, 1,1-dihydroperfluorooctyl acrylate.

14. Wool impregnated and chemically bound with a copolymer of (1) an acid chloride of the group consisting of acryloyl chloride and methacryloyl chloride, and (2) a compound of the formula

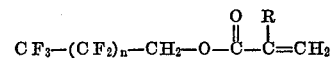

wherein R is a member of the group consisting of H and $CH_3$, and $n$ is an integer from 0 to 18.

15. Wool impregnated and chemically bound with a copolymer of methacryloly chloride and 1,1-dihydroperfluorooctyl acrylate.

16. Wool impregnated and chemically bound with a copolymer of (1) an acid chloride of the group consisting of acryloyl chloride and methacryloyl chloride, and (2) an ester of the group consisting of fluoroalkyl acrylates and fluoroalkyl methacrylates, wherein the fluoroalkyl group contains 2 to 20 carbon atoms.

17. A process for reducing the felting and shrinking tendencies of wool which comprises impregnating the wool with a solution, in an inert volatile solvent, of a copolymer of (1) an acid chloride of the group consisting of acryloyl chloride and methacryloyl chloride and (2) an ester of the group consisting of fluoroalkyl acrylates and fluoroalkyl methacrylates, wherein the fluoroalkyl group contains 2 to 20 carbon atoms, and heating the resulting impregnated wool to volatilize said solvent and to effect reaction between said wool and said copolymer thereby insolubilizing the latter in situ on the wool.

18. The process of claim 17 wherein the ester (2) has the formula

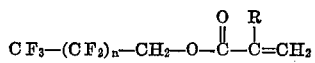

wherein R is a member of the group consisting of H and $CH_3$ and $n$ is an integer from 0 to 18.

19. The process of claim 17 wherein the ester (2) is 1,1-dihydroperfluorooctyl acrylate.

20. A process of treating hydrogen-donor textile material to improve its properties which comprises treating said textile material with a copolymer of (1) an acid chloride selected from the group consisting of acryloyl chloride and methacryloyl chloride and (2) a fluoroalkyl ester or ether which is polymerizable with said acid chloride, contains a $CH_2=C<$ grouping, which is free from a hydrogen atom reactive with an acid chloride grouping, and wherein the fluoroalkyl group contains 2 to 20 carbon atoms.

21. A process of treating organic hydrogen-donor textile material to improve its properties which comprises impregnating such textile material with a copolymer of (1) an acid chloride selected from the group consisting of acryloyl chloride and methacryloyl chloride and (2) a fluoroalkyl ester or ether which is polymerizable with said acid chloride, which contains a $CH_2=C<$ grouping, which is free from a hydrogen atom reactive with an acid chloride grouping, and wherein the fluoroalkyl group contains 2 to 20 carbon atoms, and heating the resulting impregnated textile material to effect reaction between the said textile material and the said copolymer, thereby insolubilizing the latter in situ on the textile material.

22. The process of claim 21 wherein the compound (2) is an ester of the group consisting of fluoroalkyl acrylates and fluoroalkyl methacrylates.

23. The process of claim 21 wherein the compound (2) is an ester of the formula

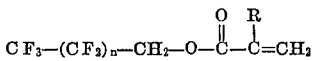

wherein R is a member of the group consisting of H and $CH_3$ and $n$ is an integer from 0 to 18.

24. The process of claim 21 wherein compound (2) is 1,1-dihydroperfluorooctyl acrylate.

25. Hydrogen-donor textile material impregnated and chemically bound with a copolymer of (1) an acid chloride of the group consisting of acryloyl chloride and methacryloyl chloride and (2) a fluoroalkyl ester or ether which is polymerizable with said acid chloride, which contains a $CH_2=C<$ grouping, which is free from a hydrogen atom reactive with an acid chloride grouping, and wherein the fluoroalkyl group contains 2 to 20 carbon atoms.

26. The product of claim 25 wherein the said compound (2) is an ester of the group consisting of fluoroalkyl acrylates and fluoroalkyl methacrylates.

27. The product of claim 25 wherein the said compound (2) is an ester of the formula

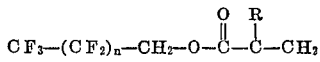

wherein R is a member of the group consisting of H and $CH_3$ and $n$ is an integer from 0 to 18.

28. The product of claim 25 wherein the compound (2) is 1,1-dihydroperfluorooctyl acrylate.

References Cited

UNITED STATES PATENTS

| | | | |
|---|---|---|---|
| 2,992,881 | 7/1961 | Berni et al. | 8—120 |
| 3,079,214 | 2/1963 | Berni et al. | 8—120 |
| 3,147,065 | 9/1964 | Koshar et al. | 8—120 |

HARRY WONG, JR., Primary Examiner

U.S. Cl. X.R.

8—116, 120, 128; 260—30.4, 33.6, 33.8, 86.1 R